3,119,811
DYES FOR COLOR PHOTOGRAPHY
Paul Dreyfuss, Basel, Switzerland, assignor to
Ciba States Limited, New York, N.Y.
No Drawing. Filed Sept. 7, 1960, Ser. No. 54,381
Claims priority, application Switzerland Sept. 9, 1959
7 Claims. (Cl. 260—179)

The present invention provides dyes for the silver dye bleach process as well as photographic material containing such dyes for the silver dye bleach process and color photographs produced therefrom.

It is known that it is possible to produce with the aid of the silver dye bleach process, which is based on the removal of dyes corresponding to the image, monochrome or polychrome photographic records. In the silver dye bleach process the image is first formed by a known photographic method by exposure and development as a silver image in a photosensitive layer homogeneously dyed with a dye. The dye present in the layer is then removed in a silver dye bleach bath in each image area proportional to the amount of image silver present in it. The silver is then removed, whereupon a dye image opposite to the original silver image is obtained. As with the known multi-pack materials which are processed according to the color coupling development there is used also in the silver dye bleach process for the production of polychrome photographs advantageously a multi-layer material comprising in general three separate component dye layers whose sensitivity is restricted to the associated spectral areas. For example, in a preferably used multi-layer combination the base is coated, one upon another, with a first layer sensitized to red containing a bluish green (cyan) dye, a second layer sensitized to green containing a purple (magenta) dye, a third yellow filter layer for eliminating any short-wave rays that are a disturbing factor in view of the inherent sensitivity of the two underlying layers, and as the topmost layer a non-sensitized, that is to say blue-sensitive, layer containing a yellow dye.

The dyes used in photographic material to be processed by the silver dye bleach process must satisfy an extremely varied range of requirements. Apart from having to be easy to bleach out, as is needed for the silver dye bleach process, such dyes must be readily soluble in water; they must not tend to diffuse in gelatine or other film-forming colloids; and they must not have an adverse effect on the photographic properties of the silver halide emulsion in which they are incorporated. They must be fast to light and possess pure tints.

In the silver dye bleach process increased photosensitivity in the individual layers is of special importance because the photosensitive silver halide layer contains a dye already at the exposure stage which dye absorbs the available exposure light and thereby diminishes the photosensitivity of the layer. The sensitizing of such dyed layers is further rendered very difficult by the fact that the hitherto known dyes used for sensitizing the layer have a strong desensitizing action on the emulsion over and above the aforementioned action of the absorption which decreases the photosensitivity.

The present invention provides new dyes which are particularly suitable for the aforementioned purpose and correspond to the general formula (1) 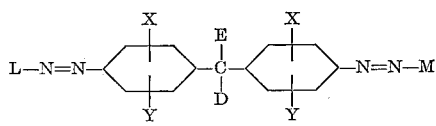

wherein D and E represent aliphatic radicals which together contain at least 5 carbon atoms; X and Y each represent a hydrogen atom or a monovalent substituent or, when X and Y are vicinal, they may constitute the complement required to form a further ring, and L and M each represent a radical of an aminohydroxynaphthalene-sulfonic acid bound to the azo linkage in vicinal position to the hydroxyl group.

The dyes of the Formula 1 can be prepared by coupling in a known manner an aminohydroxynaphthalene-sulfonic acid with a tetrazo compound of a diamine of the formula (2) 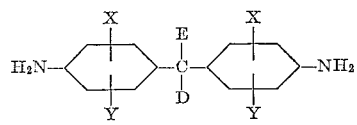

in which D, E, X and Y have the above meanings.

The diamines of the Formula 2 are likewise available by known methods, by condensing an aromatic amine of the formula (3) 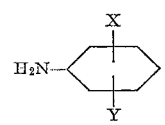

in an acid medium with an aliphatic ketone containing at least 6 carbon atoms.

Particularly suitable amines of the Formula 3 are aminobenzene and aminobenzenes substituted by halogen atoms such as chlorine, by alkyl groups such as methyl or ethyl, or by alkoxy groups such as methoxy or ethoxy, for example 1-amino-3-chlorobenzene, 1-amino-2-methyl- or-2-ethylbenzene, 1-amino-2:5- or -2:6-dimethylbenzene or 1-amino-2-methoxy-benzene. As an amine of the Formula 3 whose substituents X and Y are vicinal and form the complement to a further ring there may be mentioned 1-aminonaphthalene.

The aliphatic ketones to be condensed with such amines contain at least 6 carbon atoms, and, advantageously, in addition to the oxygen atom of the keto group only carbon and hydrogen atoms. They correspond, for example, to the formula (4) 

in which $m$ and $n$ are whole numbers, the sum $(m+n)$ being at least 5. The aliphatic radicals D and E may be branched or preferably unbranched

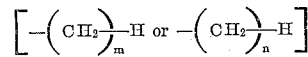

and advantageously at least one of them contains more than 5, for example 6 to 20, carbon atoms. Suitable ketones of the Formula 4 are for example Methyl-n-amylketone
Methyl-n-hexylketone
Methyl-n-heptylketone
Methyl-n-nonylketone
Ethyl-n-butylketone
Diisobutylketone
Di-(n-heptyl)-ketone While the known condensation products of aromatic amines are relatively easy to isolate in the form of crystallines substances with acetone, benzymethylketone or the like, condensation products with higher aliphatic ketones have very little crystallization tendency. Accordingly, the condensation products of the Formula 2 must be isolated from the condensation mixtures either by fractional distillation or preferably by treating the crude condensation mixture with an acylating agent such, for example, as acetic anhydride or nitrobenzoyl chloride, whereupon the readily crystallizing acylated derivatives of the formula (5)
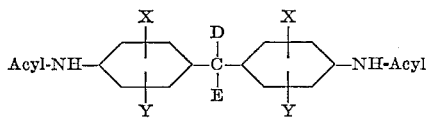

are obtained from which the pure diamines are obtained by hydrolysis, preferably in an acid medium. The acid solutions obtained by hydrolysing the acylated amines can be used as they are for the tetrazotization and dye coupling or, alternatively, the base can first be liberated from the hydrolysis solution.

The aminohydroxynaphthalenesulfonic acids to be coupled with the tetrazo compounds of the diamines of the Formula 2 may contain one or two sulfonic acid groups and a primary or substituted amino group, for example a phenylamino group or preferably an acylamino group. In general it is of advantage to couple the tetrazo compounds on both sides with the identical aminohydroxynaphthalenesulfonic acid.

Particularly valuable dyes are obtained by coupling a tetrazo compound with a 1-acylamino-8-hydroxynaphthalene-3:6- or -4:6-disulfonic acid (acyl-H acid or acyl-K acid) which correspond to the formula (6)
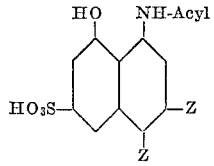

in which one Z represents a hydrogen atom and the other Z a sulfonic acid group. The acyl radical linked to the amino group is preferably derived from a benzenesulfonic acid or a benzenecarboxylic acid. In this case the compounds to be used as coupling components correspond to the formula (7)
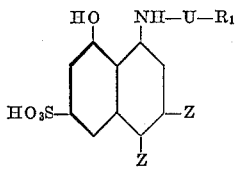

wherein the two Z's have the above meaning; U represents a —CO— or —SO$_2$— group, and R$_1$ an unsubstituted or substituted benzene radical. The benzene radical may contain, for example, as further substituent an alkyl group such as methyl or a halogen atom such as chlorine, or an acetylamino group, and if desired it may contain two or three substituents so that it corresponds, for example, to the formula (8)
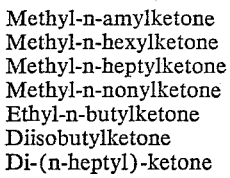

in which 2 to 5 V's represent hydrogen atoms, 0 to 2 V's methyl groups, 0 or 1 V represents a chlorine atom and 0 or 1 V an acetylamino group.

The formulae of the preferred dyes can be worked out without difficulty from the above specifications and formulae of the intermediates. In this connection special mention is made only of the dyes of the formula (9)
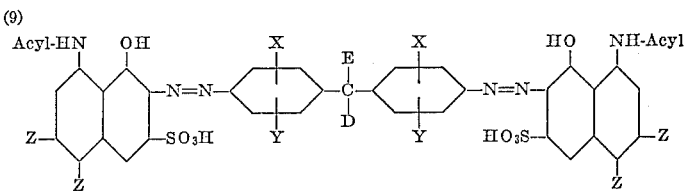

in which D, E, X, Y and Z have the above meanings and the acyl groups are preferably made up of a —CO— or —S$_2$O— bridge and a radical of the Formula 8.

The new dyes of the Formula 1 are particularly suitable for incorporation in silver halide emulsions for the production of color photographs by the so-called silver dye bleach process, because they satisfy extensively the numerous requirements mentioned below which arise in said process, namely:

They must be compatible with the silver halide emulsion, more especially with an optically sensitized silver bleachable without leaving colored radicals. They must be fast to light, more especially in the case of records viewed by incident light, and their absorption must satisfy certain spectral conditions.

In general, these dyes are purple dyes of a particularly pure tint. Insofar as they tend to diffuse they can be made stable to diffusion with basic precipitating agents such, for example, as a biguanide. By suitably selecting the components the degree of diffusion can be varied. When the radicals D and E in the diamines are increased, the resulting dyes are more stable to diffusion. However, the necessary size of D and E depends also on the contribution which the coupling component makes to the diffusion stability; it suffices therefore to use a diamine with relatively small D and E radicals to render the disazo dye from 2 mols of a coupling component of large molecular size, or one which imparts to the dye affinity for the base, stable to diffusion.

The dyes, more especially those of the Formula 9 are particularly distinguished by the fact that they are readily compatible with silver halide emulsions, more especially with optically sensitized silver halide emulsions, that is to say that they have a relatively minor desensitizing effect.

The dyes of the invention can be applied in a gelatine silver halide emulsion or together with a silver halide emulsion in another colloid; they can also be incorporated in droplets of a high-boiling crystalloid material or in a special colloid layer superimposed upon the silver halide layer; they may be non-diffusing as such or they may have been rendered non-diffusing by suitable additives. However, as is desirable for certain dye transfer processes, they may be capable of diffusion. The dyes of the invention can be cast in single layers or in multi-layer materials or in multi-pack emulsions. They are suitable for producing records to be viewed by transmitted or incident light.

In conclusion it may be stated that the dyes are also suitable for other than photographic purposes. They can be used for dyeing a wide variety of materials, for example fibers of vegetable, animal, or synthetic origin, such as cotton, wool, silk or polyamidic fibers.

Unless otherwise indicated, parts and percentages in the following examples are by weight.

*Example 1*

183 parts of the diamine of the formula

(10) 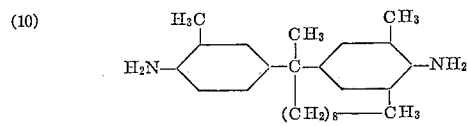

are tetrazotized in the usual manner in a hydrochloric acid solution with 70 parts of sodium nitrite and coupled with 480 parts of 1-(3'-acetylaminobenzoylamino)-8-hydroxynaphthalene-3:6-disulfonic acid in a solution alkalinized with sodium carbonate. The purple dye is filtered off and freed from salt in the usual manner. In the form of the free acid it corresponds to the formula

(11) 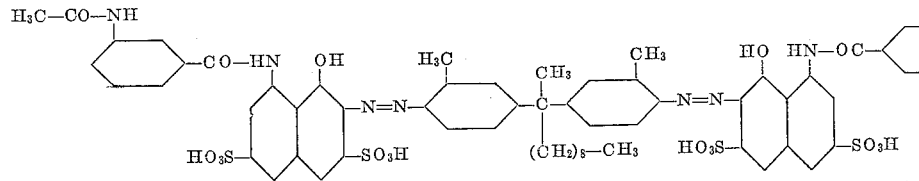

It is very readily soluble in water, does not diffuse in gelatine, has a high brilliance, it is readily compatible with silver halide emulsions, and can be bleached pure white.

The diamine of the Formula 10 used as starting material can be prepared as follows:

A solution of 128 parts of 1-amino-2-methylbenzene in 120 parts by volume of hydrochloric acid of 30% strength is treated with 54 parts of methyl-n-nonylketone, and the temperature is raised within 4 hours with stirring from 60 to 110° C. The whole is then distilled while raising the temperature to 140° C., whereupon an aqueous layer and an oily layer separate in the receiver. The oil is isolated and returned to the reaction vessel. The solidified mixture is then heated under reflux for about 8 hours at 140° C., taken up in water, rendered strongly alkaline with sodium hydroxide solution, and the separated oil is subjected to steam distillation to recover the excess 1-amino-2-methylbenzene. The oily residue remaining in the distillation vessel is dissolved in benzene, dried over calcium chloride, freed from benzene and stirred with acetic anhydride. When the mixture is left to itself, the acetyl compound crystallizes out; after having been recrystallized from acetone it melts at 170° C.

A mixture of 225 parts of the acetyl compound, 2000 parts by volume of aqueous ethanol of 50% strength and 500 parts by volume of hydrochloric acid of 30% strength is refluxed for 8 hours, whereupon the alcohol is distilled off. The solution contains the hydrochloride of the diamine of the Formula 10 and can be used as it is for the preparation of the tetrazo compound. The diamine itself can be isolated from this solution with sodium hydroxide; on recrystallization from petroleum ether it forms colorless crystals melting at 55° C.

*Example 2*

The following disazo dyes are prepared as described in Example 1 by coupling on both sides the tetrazo compounds of the undermentioned diamines with 1-(3-acetylamino - benzoylamino) - 8-hydroxynaphthalene-3:6-disulfonic acid. For this purpose there are used the diamines of the formula

(12) 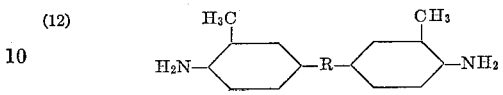

wherein R represents the following atomic groupings:

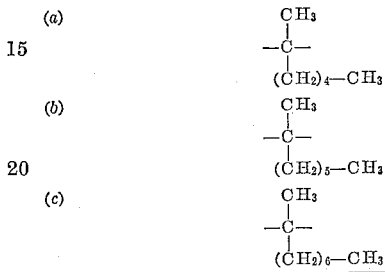

The resulting purple dyes have the same valuable properties as those mentioned in connection with the dye of the Formula 11.

The diamines of the Formula 12 can be prepared as described in Example 1 and are advantageously purified via the acetyl compound as described in Example 1.

| 1-amino-2-methylbenzene condensed with— | melting point acetyl compound, ° C. |
|---|---|
| (a) n-amylmethylketone | 207 |
| (b) n-hexylmethylketone | 197 |
| (c) n-heptylmethylketone | 178 |

*Example 3*

18 parts of the 2:2-di-(3'-methyl-4'-aminophenyl)-n-undecane of the Formula 10 or the corresponding quantity of 2:2-di-(4'-aminophenyl)-n-undecane are tetrazotized in an aqueous hydrochloric acid solution and coupled in a solution, alkalinized with sodium carbonate, with 52 parts of 1-(4'-chloro-2':5'-dimethylphenyl-sulfonylamino) - 8 - hydroxynaphthalene-3:6-disulfonic acid. The dye formed is isolated, and purified by being dissolved in water and precipitated again with sodium chloride; it is obtained free from salt by being dissolved in water, precipitated with sodium acetate and washed out with ethanol. In the form of its free acid it corresponds to the formula

(13) 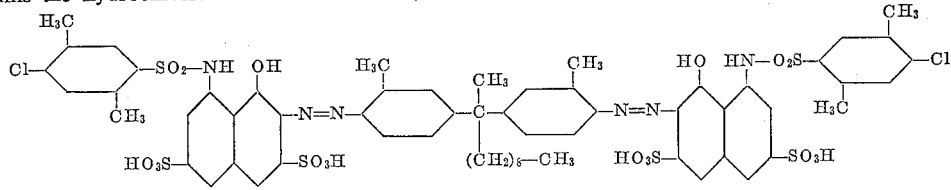

It is readily soluble in water and is of a pure purple tint. When incorporated in a gelatine layer it does not diffuse into an adjacent layer and can be bleached in the presence of a silver image without forming undesirable colored decomposition products.

Example 4

A cellulose acetate film is coated with the following layers in the undermentioned order of succession:

(1) A silver bromide emulsion sensitized to red which contains the cyan dyestuff of the formula

(14)
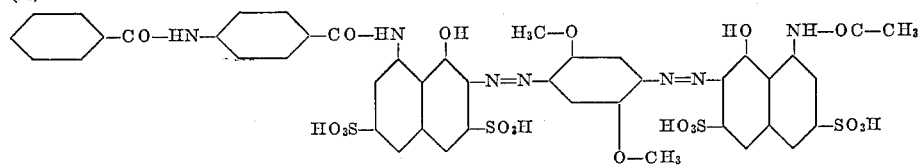

(2) A silver bromide emulsion sensitized to green which contains the purple dyestuff of the Formula 11 described in the above Example 1.

(3) A yellow filter layer formed by colloidal silver.

(4) A non-sensitized silver bromide emulsion containing a yellow azo dye.

The film produced as described above is processed by the usual methods of the silver dye bleach process. Its photosensitivity in all its dyed layers is sufficient for the usual lighting conditions. The material is exposed, for example, under a colored positive master, developed in a metol hydroquinone developer, fixed, and bleached in a dye bleach bath prepared from hydrochloric acid, thiourea and phenazine. After removal of the excess silver in a Farmer's reducer a record in natural colors is obtained. It is of advantage to subject the record after the last water bath and before drying, for 3 minutes to a treatment in a sodium carbonate solution of 1% strength and then to a short rinse.

The azo dye of the Formula 14 can be prepared as follows:

198 parts of 1-amino-2:5-dimethoxy-4-nitrobenzene are diazotized in a hydrochloric acid suspension and the diazo compound is coupled with 361 parts of 1-acetyl-amino-8-hydroxynaphthalene-3:6-disulfonic acid. The resulting nitromonoazo dye is reduced in an alkaline medium with sodium sulfide to form the aminomonoazo dye which is purified by reprecipitation, then diazotized, and the diazo compound is coupled in a mixture of pyridine and aqueous ammonia with 542 parts of 1-(4-benzoyl-amino-benzoylamino)-8-hydroxynaphthalene-3:6-disulfonic acid. The resulting disazo dye is freed from violet impurities by repeated reprecipitation. It dyes gelatine a pure bluish green tint. As the yellow dye for the non-sensitized silver bromide emulsion there may be used, for example, the dye obtained in the following manner:

175 parts of 1-aminobenzene-3-sulfonic acid are diazotized and the diazo compound is coupled with 227 parts of 1-amino-3-(3'-aminobenzoylamino)-benzene. The dye formed is salted out, filtered off, dissolved in water and treated at room temperature with phosgene while keeping the reaction solution at a neutral reaction by adding sodium carbonate. On completion of the phosgenation the reaction mixture is allowed to turn acidic, the dye which has separated in brown flocks is filtered off and thoroughly washed with water. The residue is digested with sodium carbonate solution of 2% strength, whereupon a small amount of dye present, which diffuses slightly in gelatine, passes into solution, whereas owing to the salting-out effect of sodium carbonate the main product does not dissolve. The residue is dried; it forms a brown powder which is readily soluble in water with a pure yellow coloration.

What is claimed is:

1. A disazo dyestuff of the formula

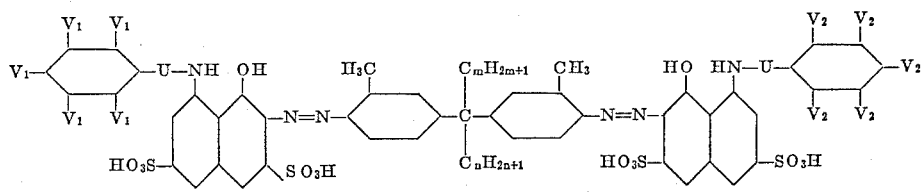

in which —U— is a member selected from the group consisting of —CO— and —SO$_2$—, at least two and at most five $V_1$'s and at least two and at most five $V_2$'s are H, 0 to two $V_1$'s and 0 to two $V_2$'s are —CH$_3$, 0 to one $V_1$ and 0 to one $V_2$ are Cl, 0 to one $V_1$, and 0 to one $V_2$ are CH$_3$CONH—, and $m$ and $n$ each stands for a whole number, the sum $(m+n)$ being at least 5.

2. A disazo dyestuff which corresponds to the formula

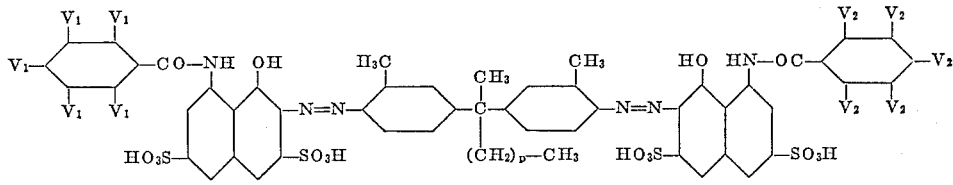

in which 2 to 5 $V_1$'s and 2 to 5 $V_2$'s represent hydrogen atoms, 0 to 2 $V_1$'s and 0 to 2 $V_2$'s methyl groups, 0 to 1 $V_1$ and 0 to 1 $V_2$ represent a chlorine atom, 0 to 1 $V_1$ and 0 to 1 $V_2$ an acetylamino group, and $p$ stands for a whole number of at least 5 and at the most 8.

3. The disazo dyestuff of the formula

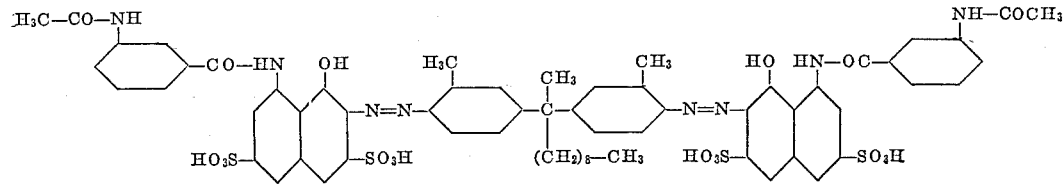

4. The disazo dyestuff of the formula
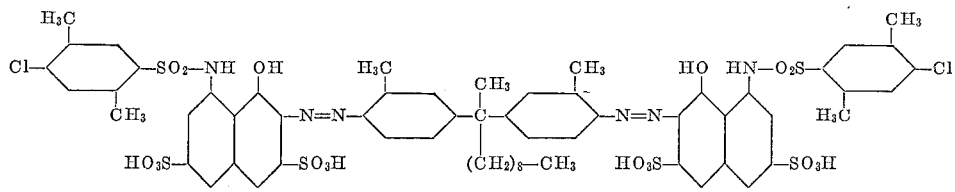
5. The disazo dysstuff of the formula
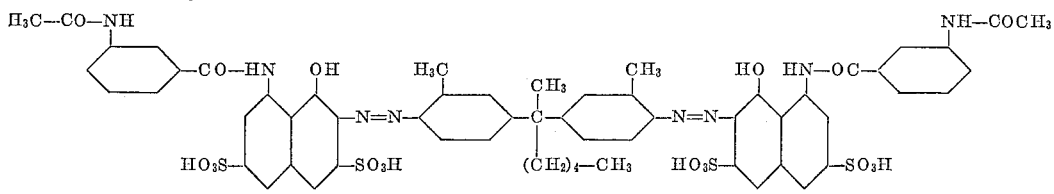
6. The disazo dyestuff of the formula
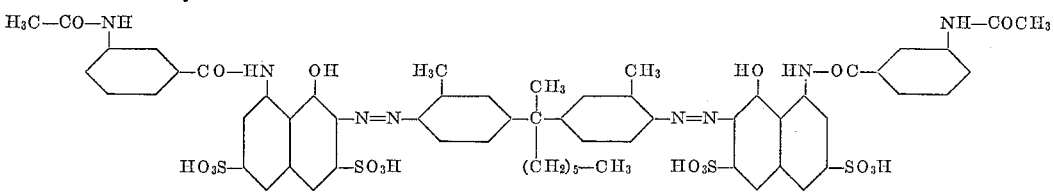
7. The disazo dyestuff of the formula
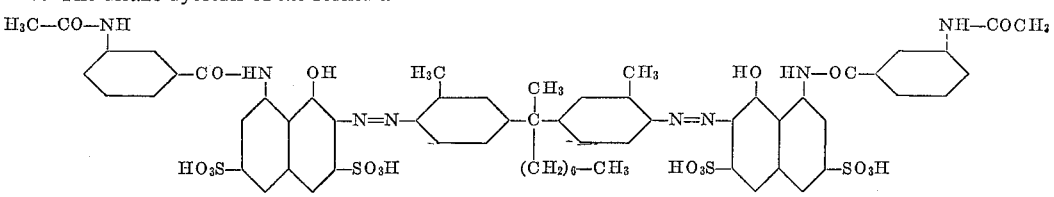
References Cited in the file of this patent
UNITED STATES PATENTS
| | | |
|---|---|---|
| 1,856,217 | Kalischcher et al. | May 3, 1932 |
| 2,286,837 | Seymour et al. | June 16, 1942 |
FOREIGN PATENTS
| | | |
|---|---|---|
| 89,557 | Switzerland | June 1, 1921 |